US012694860B2

(12) United States Patent
Scanlon

(10) Patent No.: US 12,694,860 B2
(45) Date of Patent: Jul. 28, 2026

(54) METAMATERIAL ACOUSTIC BARRIER USING VORTEX GENERATION FOR INTERNAL CIRCULATION

(71) Applicant: U.S. Army DEVCOM, Army Research Laboratory, Adelphi, MD (US)

(72) Inventor: Michael V. Scanlon, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 308 days.

(21) Appl. No.: 18/368,056

(22) Filed: Sep. 14, 2023

(65) Prior Publication Data

US 2024/0257793 A1 Aug. 1, 2024

Related U.S. Application Data

(60) Provisional application No. 63/441,481, filed on Jan. 27, 2023.

(51) Int. Cl.
*G10K 11/04* (2006.01)
*G10K 11/162* (2006.01)

(52) U.S. Cl.
CPC ............ *G10K 11/162* (2013.01); *G10K 11/04* (2013.01)

(58) Field of Classification Search
CPC ........ G10K 11/04; G10K 11/02; G10K 11/16; G10K 11/161; F01N 1/08; F01N 1/083; F01N 1/086; F01N 1/089; F01N 1/12; E04B 1/82; E04B 1/84; E04B 2001/8423; E04B 2001/8428; E04B 2001/8433
See application file for complete search history.

(56) References Cited

U.S. PATENT DOCUMENTS

| | | | | | |
|---|---|---|---|---|---|
| 1,304,096 | A * | 5/1919 | Redeker et al. | F01N 1/08 | 181/264 |
| 1,577,626 | A * | 3/1926 | Warth | F01N 3/05 | 181/263 |
| 1,601,137 | A * | 9/1926 | Maxim | F01N 1/12 | 181/279 |
| 1,816,245 | A * | 7/1931 | Wolford | F01N 1/088 | 181/274 |
| 1,906,956 | A * | 5/1933 | Gold | F01N 1/087 | 181/274 |
| 2,139,736 | A * | 12/1938 | Durham | F01N 1/087 | 55/459.3 |
| 2,153,044 | A * | 4/1939 | Jarnak | H04R 1/22 | 181/137 |
| 2,697,141 | A * | 12/1954 | Smith | H04R 1/222 | 381/357 |

(Continued)

FOREIGN PATENT DOCUMENTS

| | | | | |
|---|---|---|---|---|
| CN | 108476353 A | * | 8/2018 | G10K 11/16 |
| CN | 110599995 A | * | 12/2019 | B32B 15/04 |

(Continued)

*Primary Examiner* — Edgardo San Martin
(74) *Attorney, Agent, or Firm* — Alan I. Kalb

(57) ABSTRACT

Metamaterials that may reduce or modify the spectrum of acoustic energy or power (and/or other types of fluid energy or power) via an array of circulation elements, such as vortex diodes are described. Circulation elements may be arranged in various types of arrays (e.g., serial, parallel, etc.) that may be able to form various differently shaped metamaterial elements (e.g., sheets, boxes, tubes, etc.) appropriate for various different applications.

20 Claims, 20 Drawing Sheets

(56) References Cited

U.S. PATENT DOCUMENTS

| | | | | | |
|---|---|---|---|---|---|
| 2,841,235 | A * | 7/1958 | Curioni | F01N 1/12 | 181/280 |
| 2,908,344 | A * | 10/1959 | Hisao | F01N 1/02 | 181/269 |
| 3,461,897 | A * | 8/1969 | Kwok | F15C 1/16 | 137/809 |
| 4,164,265 | A * | 8/1979 | Kucharczyk | F24F 13/24 | 454/906 |
| 4,165,798 | A * | 8/1979 | Martinez | F01N 13/1872 | 181/282 |
| 4,189,627 | A * | 2/1980 | Flanagan | H04R 1/22 | 381/353 |
| 4,787,296 | A * | 11/1988 | Huang | F24F 7/00 | 454/212 |
| 5,672,821 | A * | 9/1997 | Suzuki | G01F 5/005 | 73/202 |
| 5,887,977 | A * | 3/1999 | Morikawa | B29B 7/44 | 138/42 |
| 5,984,519 | A * | 11/1999 | Onodera | B01F 25/23 | 516/51 |
| 6,959,782 | B2 * | 11/2005 | Brower | F01N 1/086 | 60/314 |
| 7,165,647 | B2 * | 1/2007 | Lee | H04R 19/04 | 381/372 |
| 7,644,804 | B2 * | 1/2010 | Harman | F15D 1/04 | 181/279 |
| 7,854,297 | B2 | 12/2010 | Scanlon | | |
| 10,711,670 | B2 * | 7/2020 | Karay | F01N 13/1833 | |
| 11,386,878 | B2 * | 7/2022 | Wang | E04B 1/86 | |
| 11,773,760 | B2 * | 10/2023 | Scanlon, Sr. | F01N 13/009 | 181/228 |
| 2009/0308472 | A1 * | 12/2009 | Harman | B01F 25/43141 | 137/808 |
| 2021/0172355 | A1 | 6/2021 | Scanlon | | |

FOREIGN PATENT DOCUMENTS

| | | | | |
|---|---|---|---|---|
| CN | 104732967 B * | 6/2020 | | |
| CN | 107195292 B * | 7/2020 | | G10K 11/16 |
| CN | 113192480 A * | 7/2021 | | G10K 11/168 |
| CN | 113192481 A * | 7/2021 | | G10K 11/172 |
| WO | WO-2023080864 A1 * | 5/2023 | | F24F 13/24 |

* cited by examiner

METAMATERIAL ACOUSTIC BARRIER USING VORTEX GENERATION FOR INTERNAL CIRCULATION

CROSS-REFERENCE TO RELATED APPLICATIONS

This application claims priority to U.S. Provisional Patent Application Ser. No. 63/441,481, filed on Jan. 27, 2023.

GOVERNMENT INTEREST

The invention described herein may be manufactured, used and licensed by or for the U.S. Government.

FIELD OF THE INVENTION

The invention is related to acoustic barriers and sound attenuation.

BACKGROUND OF THE INVENTION

Existing solutions limit acoustic noise using dampening materials such as foam, rubber, and vinyl or metal that is shaped to include sets of tubes, channels, and/or holes. Existing solutions are not able to be integrated into three-dimensional (3D) components utilizing appropriate materials for the application.

Therefore, there exists a need for ways to reduce or eliminate noise which may be integrated into 3D components using various materials.

BRIEF SUMMARY OF THE INVENTION

In some embodiments, a metamaterial may reduce acoustic energy or power (and/or other types of fluid energy or power) via an array of circulation elements such as vortex diodes. Circulation elements may be arranged in various types of arrays (e.g., serial, parallel, etc.) that may be able to form various differently shaped metamaterial elements (e.g., sheets, boxes, tubes, etc.) appropriate for various different applications.

BRIEF DESCRIPTION OF THE DRAWINGS

The novel features of the disclosure are set forth in the appended claims. However, for purpose of explanation, several embodiments are illustrated in the following drawings.

DETAILED DESCRIPTION OF THE INVENTION

Figure 1:
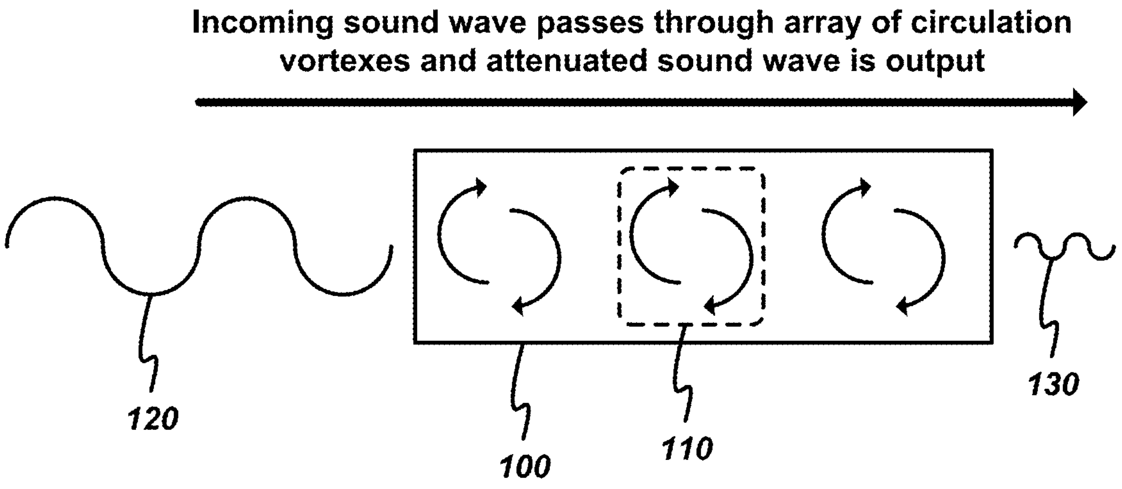
FIG. 1 illustrates an example overview of one or more embodiments described herein, in which an acoustic barrier utilizes a circulation vortex to attenuate an acoustic wave.

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide acoustic barriers that utilize vortex diodes to attenuate sound.

Sound barrier and metamaterial structures of some embodiments may exploit internal vorticity-generating features to provide acoustic attenuation, transmission, impedance, and/or reflection characteristics. Elements described herein may be applied to perforated materials, sound-proof enclosures, quieting consumer products, acoustic metamaterials, and/or other appropriate structures or components. Acoustic metamaterials may modify the index of refraction (even creating a negative index of refraction in some cases) in such a way that reflections off the materials or transmission through the materials are varied.

Metamaterials may be used to create a “cloaking” skin to reduce acoustic detection by influencing reflection and absorption, and lowering the ambient noise within volumes by redirecting sounds from and around objects or enclosures. Although many examples in this disclosure may describe acoustic pressure waves traveling within various structural features, any fluid, whether gaseous or liquid, may be influenced using the structural features disclosed herein.

Airborne acoustics, and/or gaseous or liquid noises within pipes, conduits or vessels, may be quieted using the structures described herein.

The elements described herein may be applicable to laser, radar and radio-frequency (RF) absorption, reflection, phase shifting, cloaking and transmission. Appropriately selected reflective or refractive materials, possibly in conjunction with insulator or opaque materials, located at strategic locations may promote energy circulation within the circulation chambers yet discourage the hysteretic re-radiation from within the vorticity-inducing structures.

In fluid mechanics and acoustics, a "vortex diode" creates a preferential direction for the transfer of pressure and flow into and out of a cavity or volume. The vortex diode may generate a higher resistance to transfer of pressures and flows resulting from the creation of a vortex through the tangential focusing of fluids along, for example, an outer cylindrical wall, and a lower resistance to pressure and flow when the direction is from a central port through the channels without any induced circulation.

A vortex diode may be used to preferentially and easily fill a temporary "containment" volume with acoustic pressures but slow the release of those pressures back into the source path by forcing a vortex to be formed in the exit path, thereby creating a hysteresis that deforms the acoustic time and pressure characteristics. The increased path length from multiple revolutions within the vortex, along with centripetal acceleration forming a radial pressure gradient in the circulation chamber, tend to elongate the pressure pulses, reduce the peak pressures and dissipate more heat energy by maintaining circulation away from the vortex sink, or exit.

Sheet materials may be formed to attenuate radiated sounds originating from within an enclosure, prevent outside sounds from entering into the enclosure, and/or to change the reflection or impedance characteristics of sounds contacting the enclosure. Such sheet materials may enable wind or ventilation to pass through, albeit with slightly higher resistance or backpressure, and will also attenuate sounds better than porous screens that do not incorporate vorticity-induced attenuation.

The dimensional features of the barriers or metamaterials will affect the spectral properties of the barriers or metamaterials. Port dimensions, numbers of ports, spatial extent, channel widths, internal diameters, material properties, channel cross-section shapes, and contained volumes may all have an effect on vortex generation and attenuation.

For example, three pressure-sealed (bonded) components on flat sheet material (e.g., metal, plastic, ceramic, etc.) may form one 3D vortex diode element. Electro-chemical, water-jet, lasers, wire electrical discharge machining (EDM), and/or plasma cutters may be used to create planar or 3D laminates. Sheets of vortex diode components may be laminated together to form arrays of components. Pressure bonding may be used to create arrays and pressure-seal passageways created by multiple laminates.

FIG. 1 illustrates an example overview of one or more embodiments described herein, in which an acoustic barrier 100 utilizes a circulation vortex 110 to attenuate an acoustic wave 120. As shown, acoustic barrier 100 may include an array of circulation vortexes 110, such as vortex diodes, that attenuate an acoustic wave 120 received at an inlet of the acoustic barrier 100, such that an attenuated acoustic wave 130 is produced at an outlet of the acoustic barrier 100.

In this example, a set of three circulation vortexes 110 is arranged in series (i.e., an outlet of one circulation vortex faces an inlet of a next circulation vortex), but different embodiments may include different numbers of elements arranged in various different ways, as described below. Each circulation vortex 110 may be sized to attenuate a desired frequency and/or range of frequencies.

In this example, acoustic wave 120 may pass through three circulation vortexes 110 in series, where each circulation vortex 110 has the same size as each other circulation vortex 110. Different embodiments may include various different arrays of circulation vortexes 110, as described below (e.g., serial, parallel, etc.) that may include any number of such circulation vortexes 110, as appropriate for the dimensions and/or other attributes of the acoustic barrier 100.

In this example, the acoustic wave 120 is attenuated such that the attenuated acoustic wave 130 has one fourth the power or energy of the acoustic wave 120. In some cases, such attenuation may be uni-directional (i.e., acoustic waves that pass from the outlet of acoustic barrier 100 to the inlet of acoustic barrier 100 may not be attenuated).

Although many examples throughout this disclosure may refer to acoustic attenuation, one of ordinary skill in the art will recognize that such elements may be applied to attenuation with respect to various types of fluids and/or movements thereof.

Figure 2:
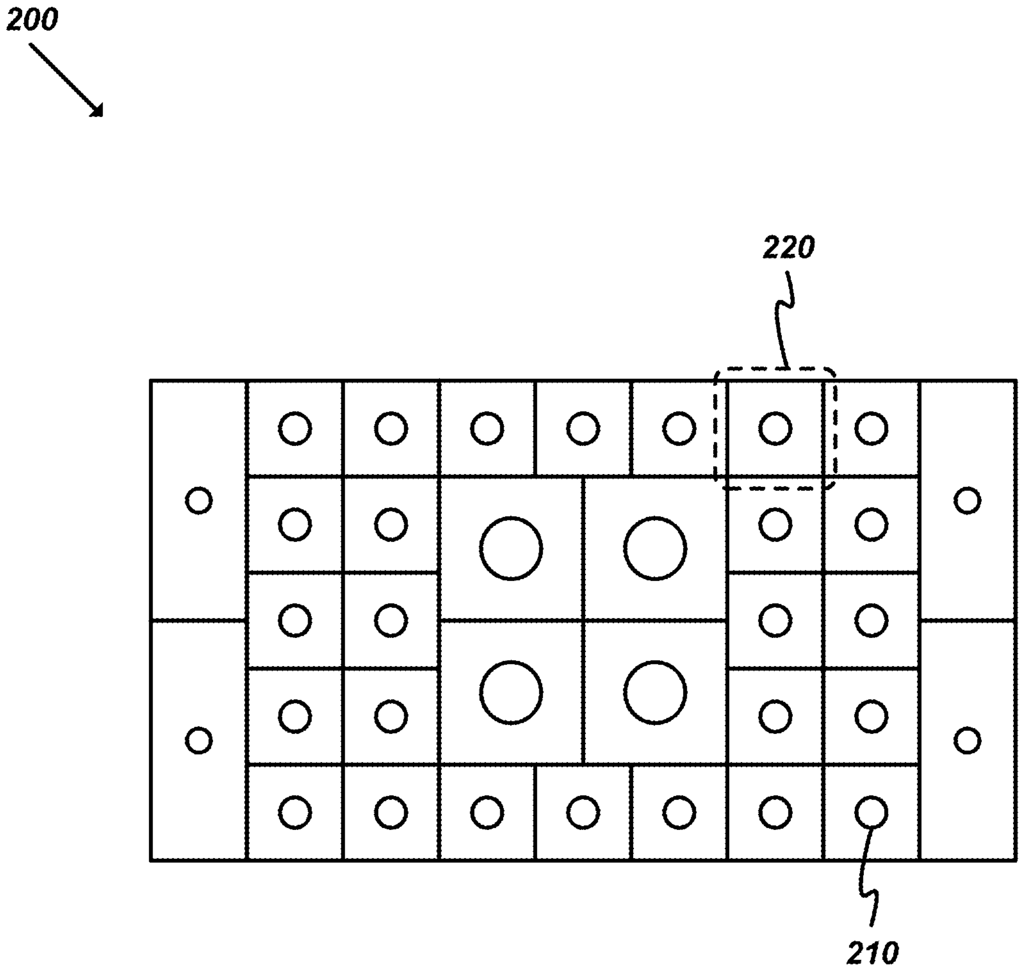
FIG. 2 illustrates a front elevation view of a metamaterial with varying size ports and volumes of one or more embodiments described herein.

FIG. 2 illustrates a front elevation view of a metamaterial 200 with varying size ports 210 and volumes 220 of one or more embodiments described herein. The metamaterial may include a front or face plate, a frame or skeleton of a specified thickness (not shown), and/or a rear or back plate. Each volume 220 may include a volume between the front and back plates around each port 210, where each port 210 may be associated with a separate and distinct volume 220. In this example, port 210 may be a through-hole or cylindrical conduit that serves as inlet and outlet.

This example metamaterial includes a diversity of ports 210, expansion volumes 220, and patterns of differently sized elements. This example does not utilize circulation, does not provide hysteresis, and does not utilize or include vorticity or vortex-diode features.

In this example, metamaterial 200 utilizes a simple structure including a frame or skeleton and two plates coupled to the frame. Different embodiments may include and/or utilize metamaterial with complex non-circulating metamaterial with, for example, corrugated and honeycomb structures. More complex internal structures may include surface corrugation, varying angles, volumes and paths, serial and parallel chamber ports and/or passages.

Vortex diodes and/or other circulating vortex elements of some embodiments may be integrated into similar metamaterials as metamaterial 200.

Figure 3:
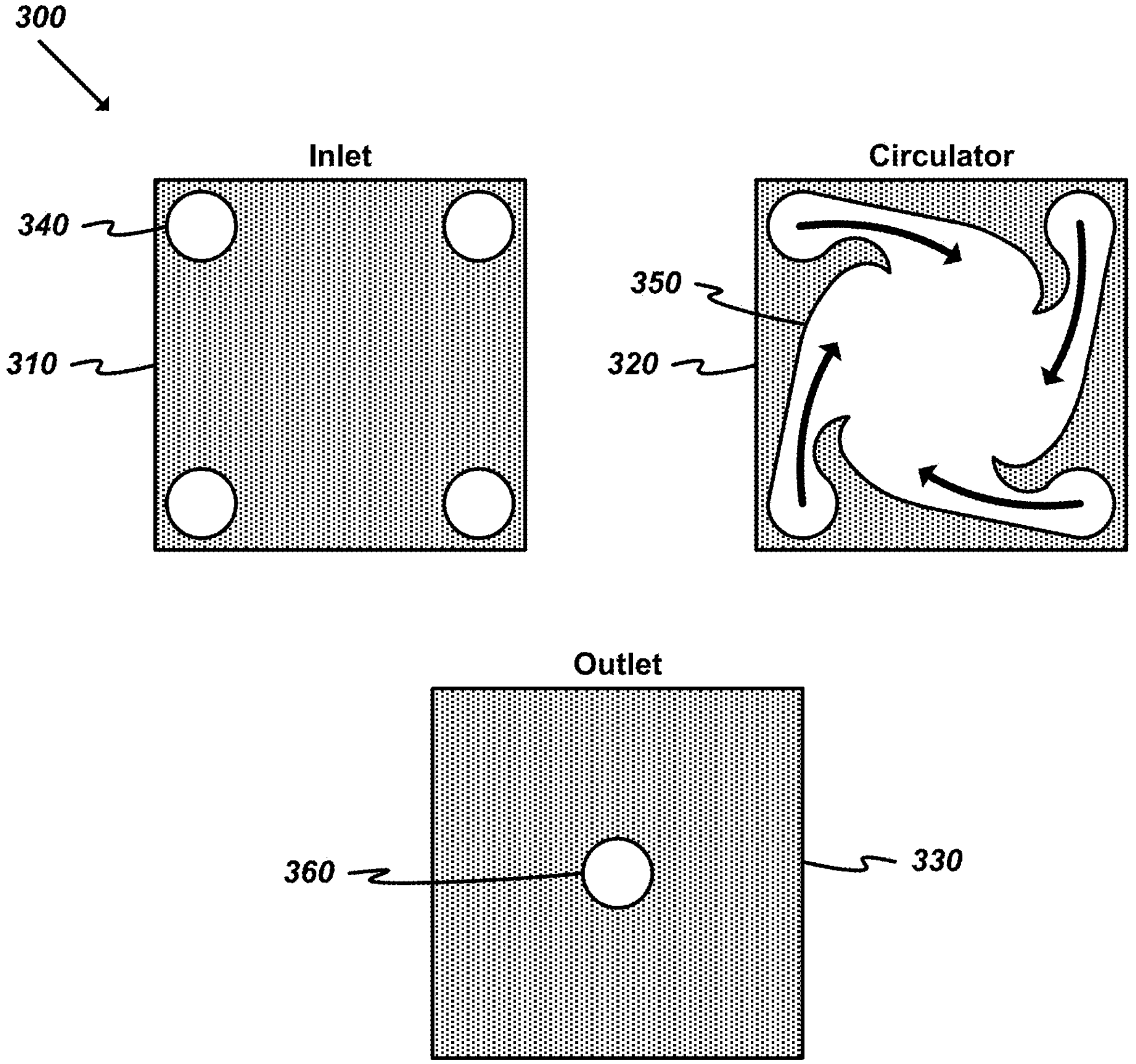
FIG. 3 illustrates a top plan view of components of a vortex diode of one or more embodiments described herein.
Figure 4:
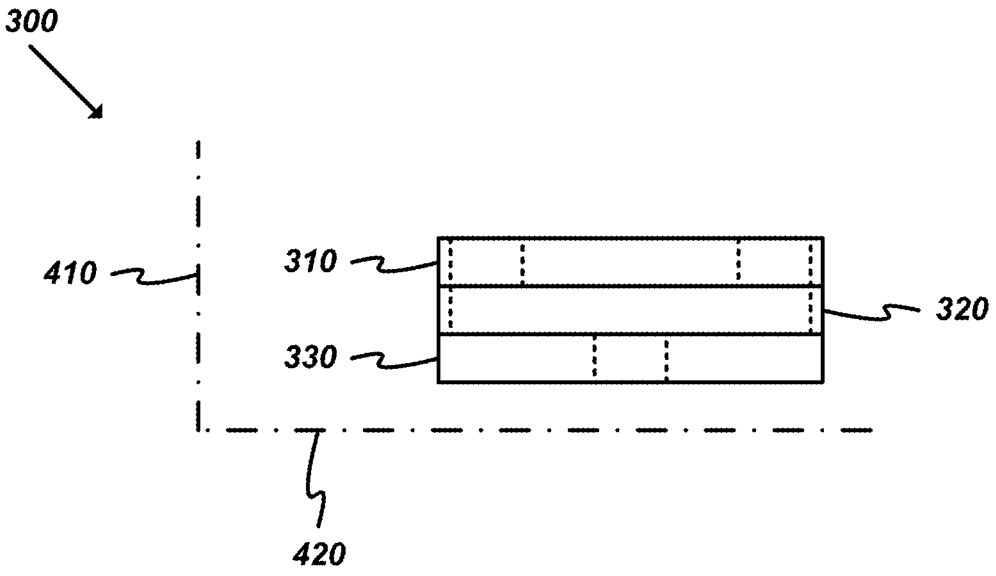
FIG. 4 illustrates a side elevation view of the vortex diode of FIG. 3.

FIG. 3 illustrates a top plan view of components of a vortex diode 300 of one or more embodiments described herein. FIG. 4 illustrates a side elevation view of the vortex diode 300. As shown, the vortex diode 300 may include an inlet 310, a circulator 320, and an outlet 330. In this example, the components 310-330 are flat rectangular plates having a specified thickness. Different embodiments may include various different such components of varying shape, size, etc. Vortex diode 300 may include materials such as metal, plastic, rubber, silicone, etc. In this example, the vortex diode 300 has a cuboid shape that may be combined with any number of other vortex diodes 300 in an array of rows, columns, and/or sheets.

In this example, inlet 310 includes a set of four inlet ports 340 that are arranged to direct fluid to input regions of circulator 320 that are aligned with the inlet ports 340 as shown. In this example, the inlet ports 340 are cylindrical cavities. Circulator 320 may include or provide an expansion volume 350 where fluids or waves may circulate in a vortex, as indicated by the thick arrows. In this example, expansion volume 350 may include four tangential jets (or "sources"), associated with the four inlet ports 340. Expansion volume 350 may include a round center cavity or "circulation chamber", as shown, where a vortex may be circulated. Outlet 330 may include one or more outlet ports 360 (or "sink"). In this example, outlet port 360 is a cylindrical cavity. In this example, the outlet port 360 is centered within the outlet 330 as shown, and also centered with respect to the expansion volume 350. In this example, the components 310-330 may be symmetrical about a center point.

As shown, in this example the inlet ports 340, outlet ports 360, and perimeter walls of the components 310-330 may be aligned with a first axis 410 (which may be referred to as a "vertical" axis in this orientation). The top and bottom surfaces of the components 310-330 may be aligned with a perpendicular axis 420 (which may be referred to as a "horizontal" axis in this orientation). In this example, components 310-330 have equal thickness as each other component, but different embodiments may include elements of different thicknesses (for example, the inlet 310 and/or outlet 330 may be thinner than the circulator 320).

The components 310-330 may be coupled together using adhesives, fasteners, and/or other appropriate ways. In some cases, the components may be manufactured as a single element, such as via injection molding.

In this example, sounds or fluids that enter inlet ports 340 may be recirculated within expansion volume 350 and attenuated before exiting outlet port 360. Sounds or fluids that enter outlet ports 360 may exit inlet ports 340 without being attenuated or recirculated.

Each vortex diode may generally include an inlet with a set of one or more inlet ports, an outlet with a set of one or more outlet ports, and a circulation vortex volume such as a cavity with at least one curved wall section.

Figure 5:
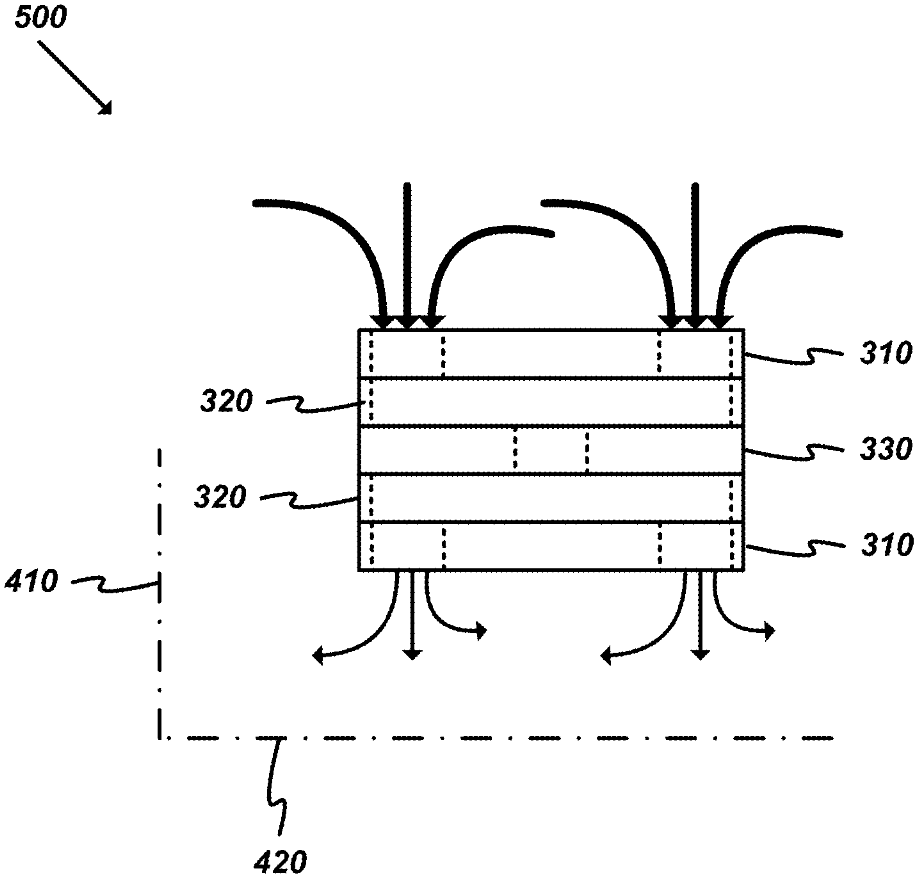
FIG. 5 illustrates a side elevation view of a vortex diode configuration of one or more embodiments described herein.

FIG. 5 illustrates a side elevation view of a vortex diode 500 of one or more embodiments described herein. This five-layer vortex diode 500 may provide a symmetrical response from either direction parallel to axis 410 (e.g., sound may be attenuated from either direction). The overpressure and suction impinging on the top of the vortex diode 500 may have symmetrical performance when acting on the bottom face of the vortex diode 500.

Larger sheets of laminates with proper hole and/or channel registration to implement vortex diode 300 and/or vortex diode 500 may include a multiple of such configurations of components 310-330 arranged in a matrix or array along the sheets. Such sheets may be used to form, for example, the sides of an enclosure to keep sounds in or out, or configured to create a sound barrier or wall to prevent reflections or the transfer of sounds from one area to another.

Figure 6:
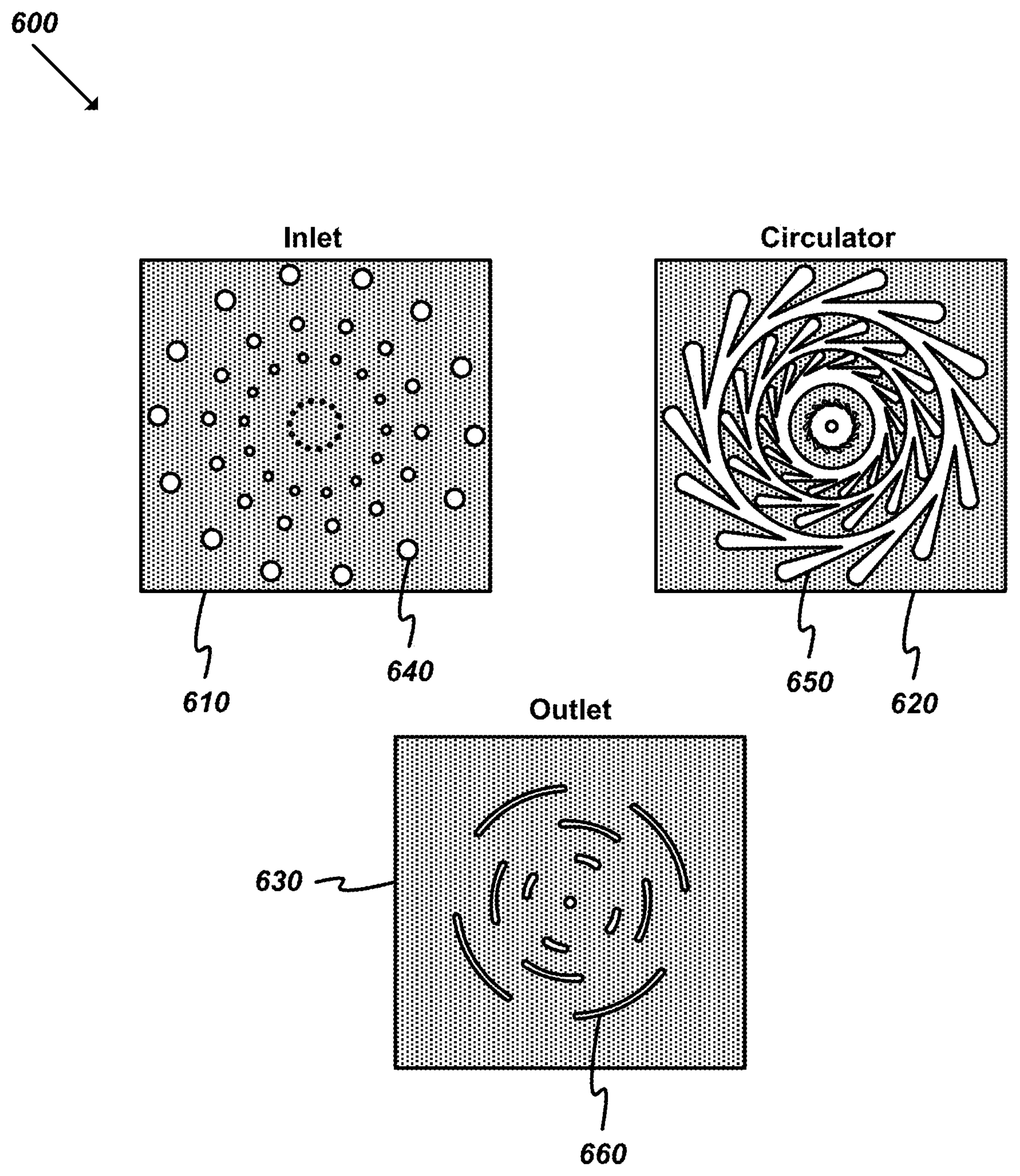
FIG. 6 illustrates a top plan view of components of a vortex diode of one or more embodiments described herein.

FIG. 6 illustrates a top plan view of components of a vortex diode 600 of one or more embodiments described herein. As shown, the vortex diode 600 may include an inlet 610, circulator 620, and outlet 630. The components 610-630 may be arranged in a similar manner to components 310-330 described above. The vortex diode 600 provides diversity in the number of jets and circulation diameters.

As shown, inlet 610 may include multiple inlet ports 640 (round through-holes, in this example) of differing size. Circulator 620 may include multiple expansion volume cavities 650 of differing size, each having a set of input regions aligned with inlet ports 640. Outlet 630 may include multiple outlet ports 660 sized and shaped to coincide with the various expansion volume cavities 650.

The nested 3D vortex diode 600 may include four annular circulation regions for vortexes to form as a result of the numerous tangential jets reinforcing pressure expansion and attachment along the outermost diameter wall of the expansion volume cavities 650. The outlet ports 660, or sinks, within the channels are implemented as four thin slots along the innermost wall of the three larger circulation channels 650, and a single round outlet port 640 at the center of the smallest circulation region of the expansion volume cavities 650.

The circulator 620 and outlet 630 may be formed as a single laminate using 3D printing technology in some embodiments. The inlet port 640 pattern on the inlet 610 may be printed or cut and glued or otherwise adhered to the circulator 620 and outlet 630 with proper alignment.

Figure 7:
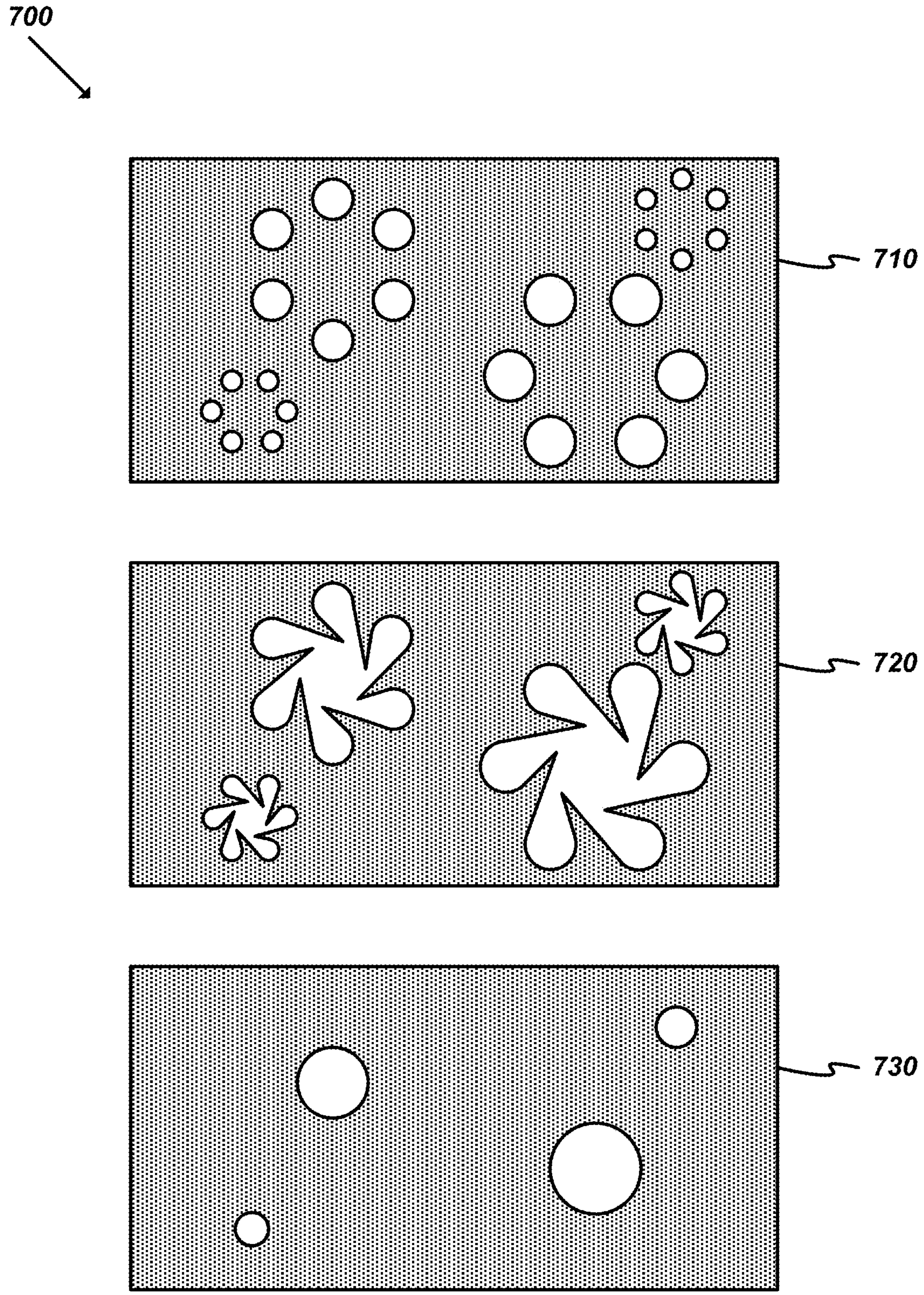
FIG. 7 illustrates a top plan view of components of a vortex diode of one or more embodiments described herein.

FIG. 7 illustrates a top plan view of components of a vortex diode 700 of one or more embodiments described herein. As shown, the vortex diode 700 may include an inlet 710, circulator 720, and outlet 730. The components 710-730 may be arranged in a similar manner to components 310-330 described above. This example vortex diode 700 may include four different sizes of five-inlet, vorticity-inducing elements.

To account for the variances of wavelength-based circulation and broadband acoustic transmission due to size features, a variety of vortex diodes or circulation chambers can be configured into a single element or array of elements, as shown. The numbers of ports, the sizes of the ports, the diameters of the circulation regions, and the channel dimensions are examples of attributes that may be varied to diversify the acoustic bandpass or rejection properties.

Figure 8:
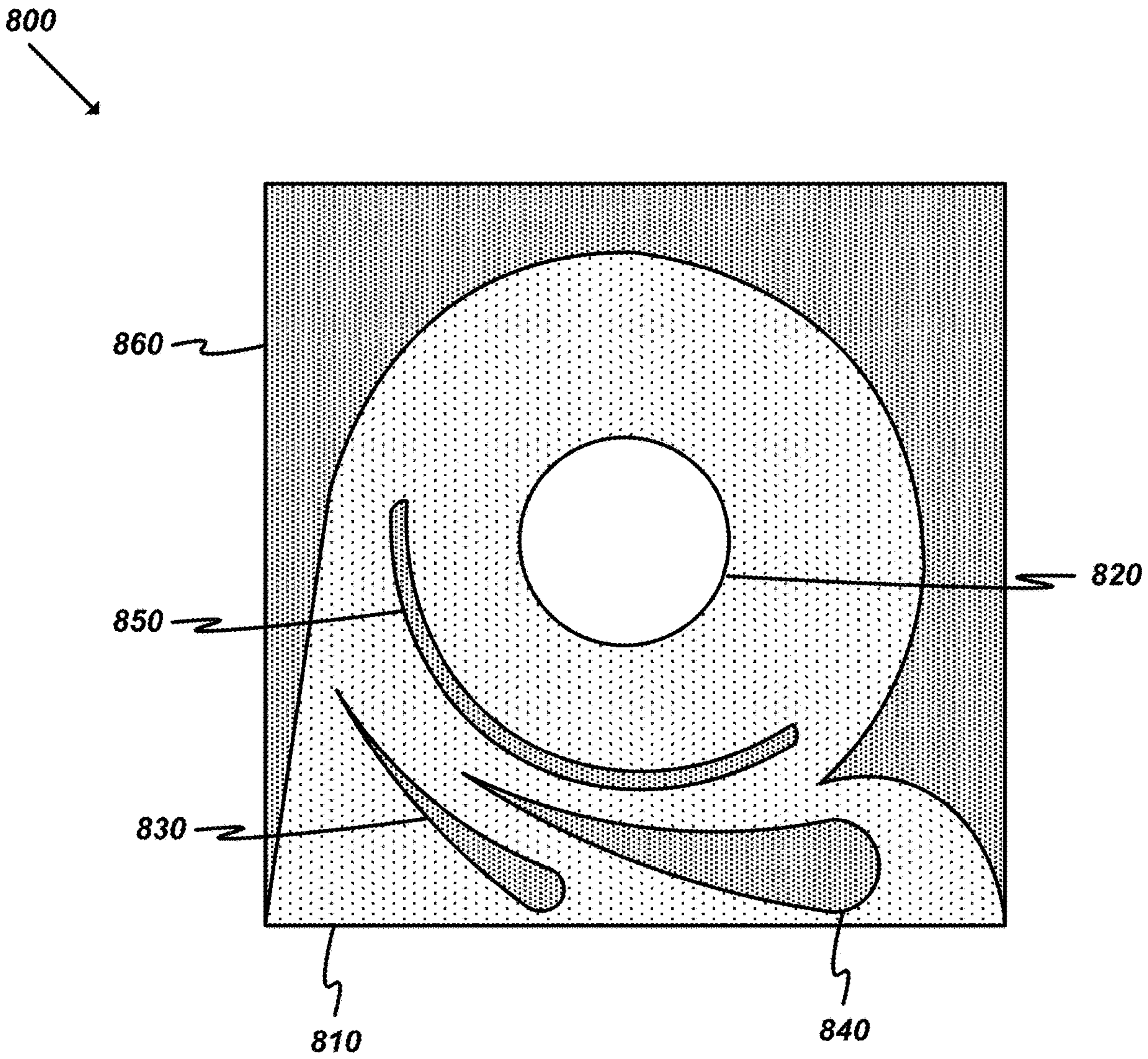
FIG. 8 illustrates a top plan view of a vortex diode of one or more embodiments described herein.

FIG. 8 illustrates a top plan view of a vortex diode 800 of one or more embodiments described herein. As shown, in this example, vortex diode 800 may include an inlet 810, an outlet 820, various flow guides 830-850, and an outer wall 860 that at least partially defines a circulation chamber.

Figure 9:
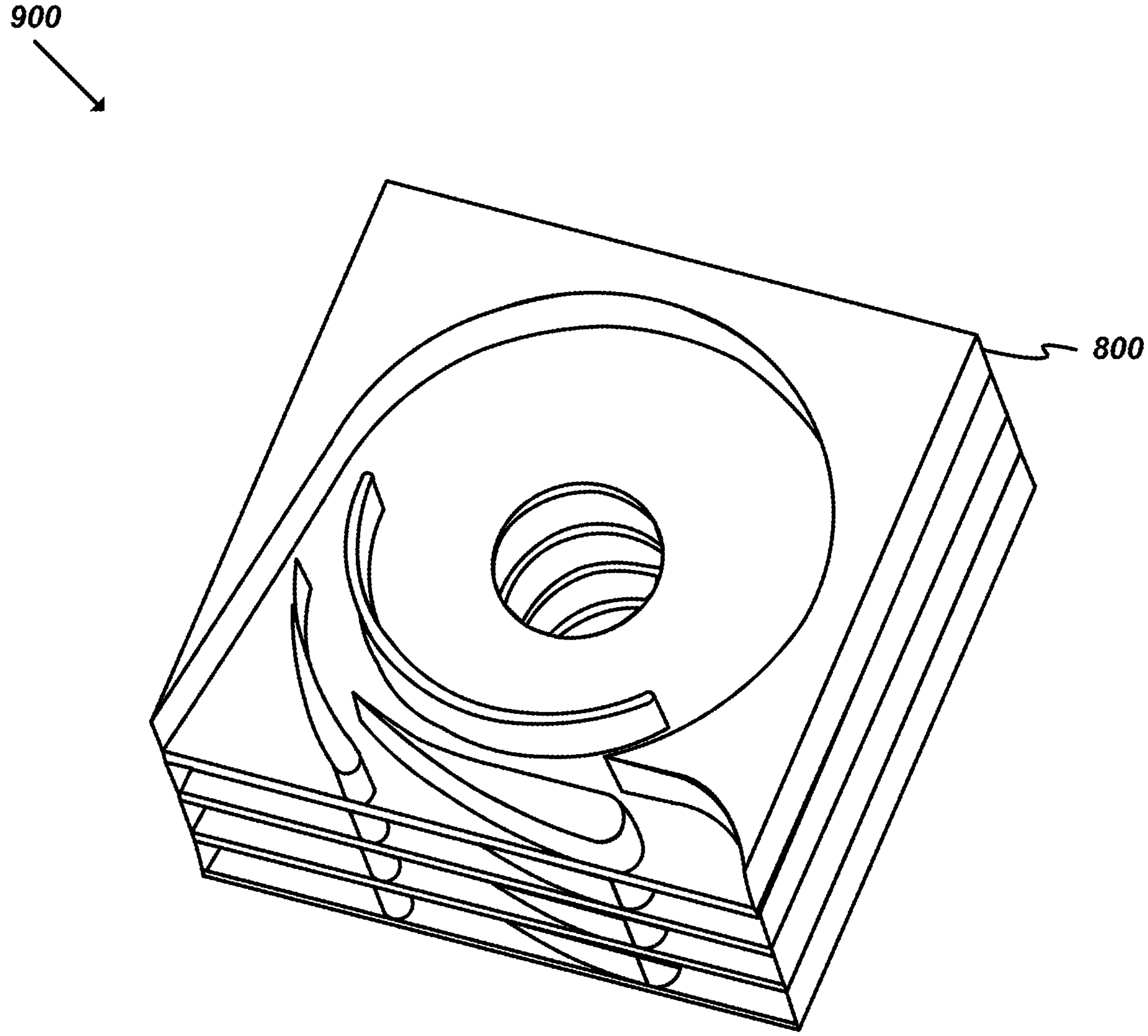
FIG. 9 illustrates a front, top, right side perspective view of a vortex diode configuration of one or more embodiments described herein.

FIG. 9 illustrates a front, top, right side perspective view of a vortex diode 900 of one or more embodiments described herein. As shown, the vortex diode 900 may include multiple vortex diodes 800 arranged in an aligned stack as shown. The aligned stack is an example of an array of vortex diodes 800 arranged in parallel, where the inlets and outlets of multiple vortex diodes 800 are aligned in the same direction. In this example, each vortex diode 800 has the same orientation as each other vortex diode 800.

In this example, four vortex diodes 800 are stacked together to form a vertical array, such as along axis 410. Each layer of this array 900 may include three input ports along inlet 810, separated by flow guides 830 and 840, that provide three tangential passageways to the large-diameter circulation region. There may be an inner thin wall flow guide 850 that helps to form the annular channel, and also promotes circulation within the circular chamber by allowing the pressures to migrate to the inner diameter due to centripetal acceleration from the vortex.

Pressures following the outermost path are deflected through the annular channel of the inlet 810 by overlapping sections of the input deflector flow guides 830-840; forcing continued circulation. Because there is a central sink or outlet 820 with lowest pressures, the vortex motion is reinforced. A negative pressure acting on the input face ports may be immediately supplied with pressures within the annular channel of the input region without regard to circulation, and may not promote any additional vortex motion. This negative pressure also may be supplied by the central outlet 820, but will migrate directly to the exterior ports (e.g., outlets 820 at the top or bottom of the vortex diode 900) without any induced circulation.

Figure 10:
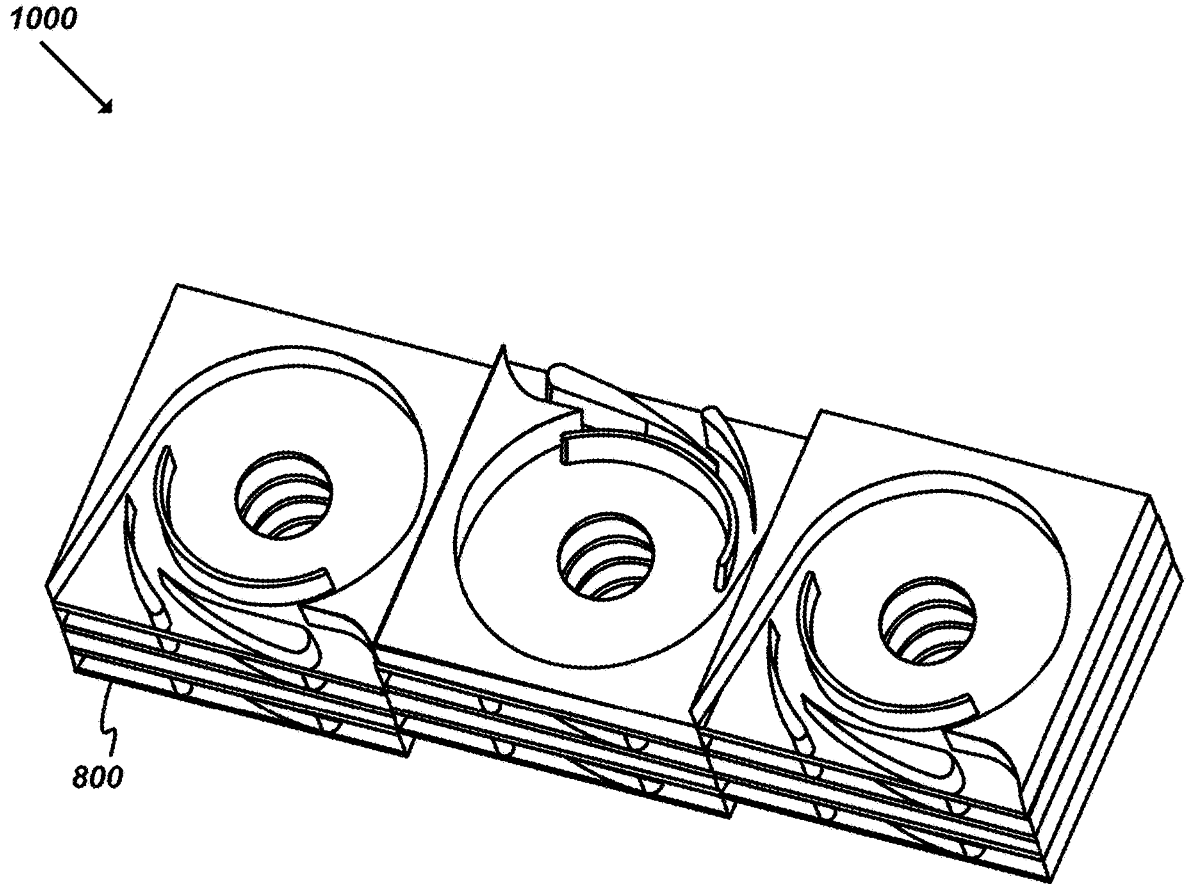
FIG. 10 illustrates a front, top, right side perspective view of a vortex diode configuration of one or more embodiments described herein

FIG. 10 illustrates a front, top, right side perspective view of a vortex diode 1000 of one or more embodiments described herein. In this example, multiple vortex diodes 800 are arranged with alternating orientations (e.g., rotated by one hundred eighty degrees). Such an arrangement provides input ports on every other element on one face, and a similar but offset configuration on the opposing face. The central ports 820 are connected and act as a parasitic capacitance to the averaged response of the faces.

The vortex diodes 800 may be stacked and arrayed to form a large 3D sheet or barrier with any number of rows, columns, and/or levels. The linked central outlets 820 may provide a passive large volume capacitance, and/or may be actively influenced by a positive or negative pressure to modify the input impedance, the vortex formation, sustainment and broadband acoustic transmission characteristics, and/or other relevant operating attributes.

Figure 11:
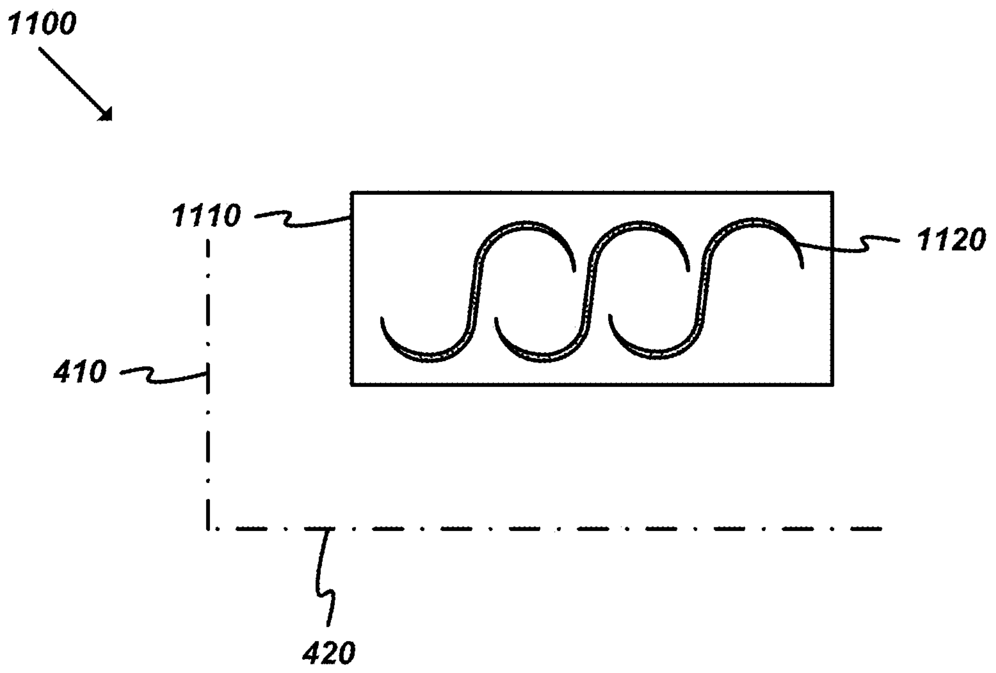
FIG. 11 illustrates a top plan view of an internal vortex circulator of one or more embodiments described herein.

FIG. 11 illustrates a top plan view of a vortex circulator 1100 of one or more embodiments described herein. As shown, the vortex circulator 1100 may include a flat surface 1110 (or other topological surface, as appropriate), and multiple vortex structures 1120 along the flat surface 1110.

When printed in thin strips along the flat surface 1110, the vortex structures or "S-curves" 1120 may be stacked to form a complex 3D geometry. When positive pressure of a percussion hits an upper port of the vortex structure 1120, formed at the gap between two adjacent S-curves 1120, the pressure velocity may be directed along the central wall and form a vortex in the circular region between the two adjacent S-curves 1120. The pressure wave has the opportunity to circulate more than one revolution and may expand radially along the vortex path due to centripetal acceleration that reinforces radially outward and away from the central sink. Once the negative pressure of the rarefaction acts on the same upper-port gap, pressure may be sucked out of the central cavity without resistance from any continuing vortex. The negative pressure on the central cavity also may cause suction and intake through the lower gap between S-curves 1120. However, this entrained fluid may be sucked directly toward the upper port, across the center of the region and does not induce vortex circulation. Only when an ensuing percussion hits the upper port will new vortex circulation be initiated, in some embodiments.

Figure 12:
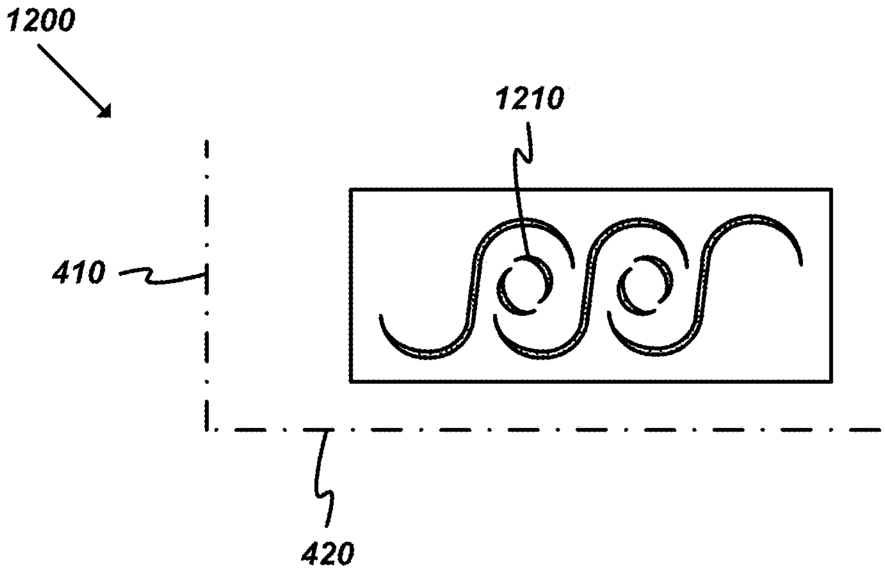
FIG. 12 illustrates a top plan view of an internal vortex circulator of one or more embodiments described herein.

FIG. 12 illustrates a top plan view of an internal vortex circulator 1200 of one or more embodiments described herein. In this example, vortex structure 1120 is augmented with interior chamber structure 1210 to further induce vorticity.

A positive pressure acting on the upper port will cause a clockwise circulation in the outer annular chamber. At the two inner chamber gaps there are opportunities for the circulation to enter the inner cylindrical circulation chamber and continue clockwise circulation. However, once the negative pressure acts on the upper port, pressure from the outer circulation region and the closest inner circulation region gap may instantly provide the necessary pressure without circulation inducement. As before, the negative pressure also may suck in fluid from the lower port, but the fluid may travel directly toward the opposite port in the path of least resistance without inducing any additional vorticity. In some embodiments, there may be more than one internal circulation region gap, and the sizes and locations may be optimized to generate more or less hysteresis, as desired.

Figure 13:
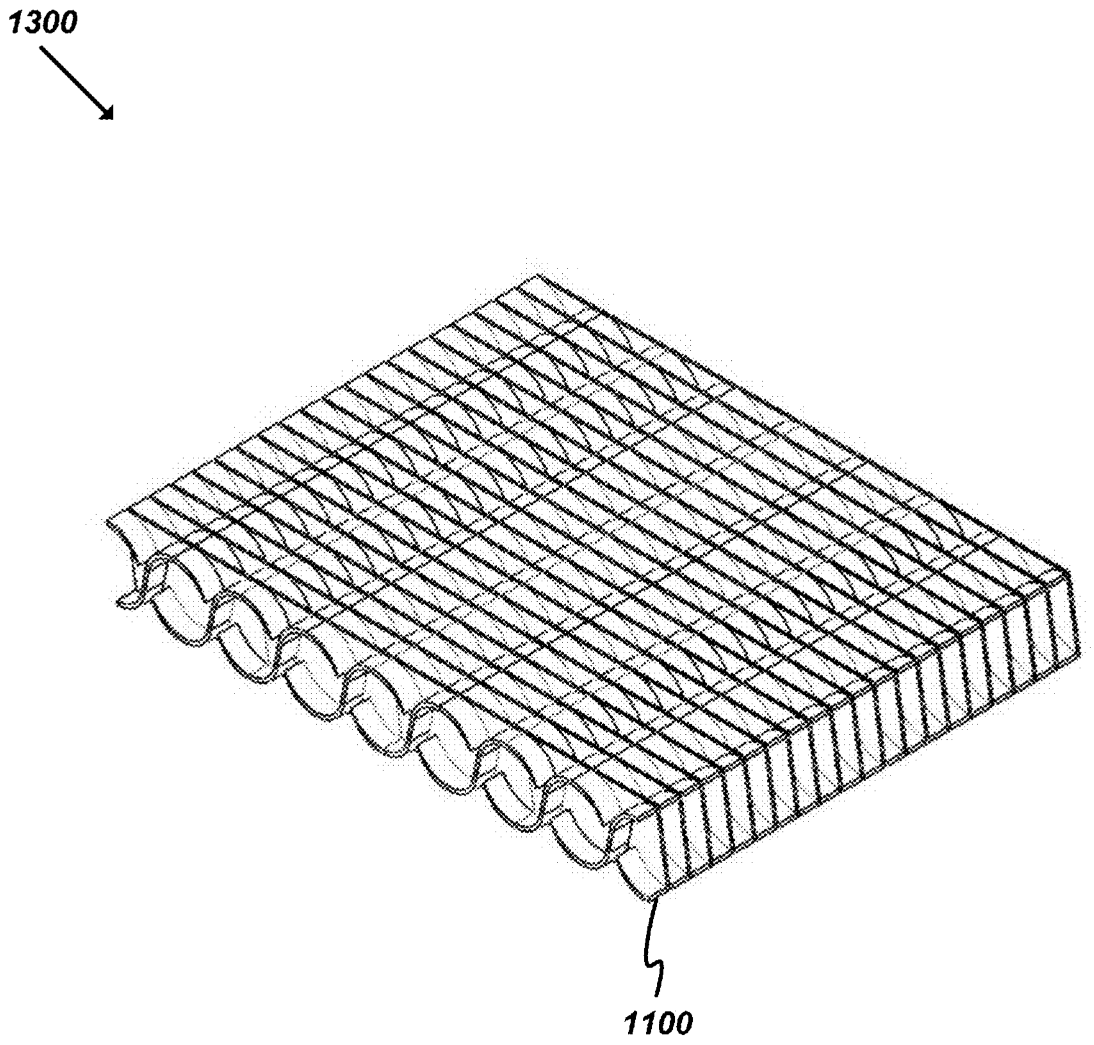
FIG. 13 illustrates a front, top, right side perspective view of a vortex diode configuration of one or more embodiments described herein.

FIG. 13 illustrates a front, top, right side perspective view of a vortex diode 1300 of one or more embodiments described herein. In this example, the vortex diode 1300 may form a sheet material or "coupon", as shown.

In this example, multiple strips of the vortex circulator 1100 may be combined to form a 3D sheet. A 3D sheet of these types of structures may be cast or injection molded in a larger sheet with excess materials flexible enough to act as hinges to fold a continuous sheet accordion-style into the geometry shown here and fused together with heat or adhesive.

Figure 14:
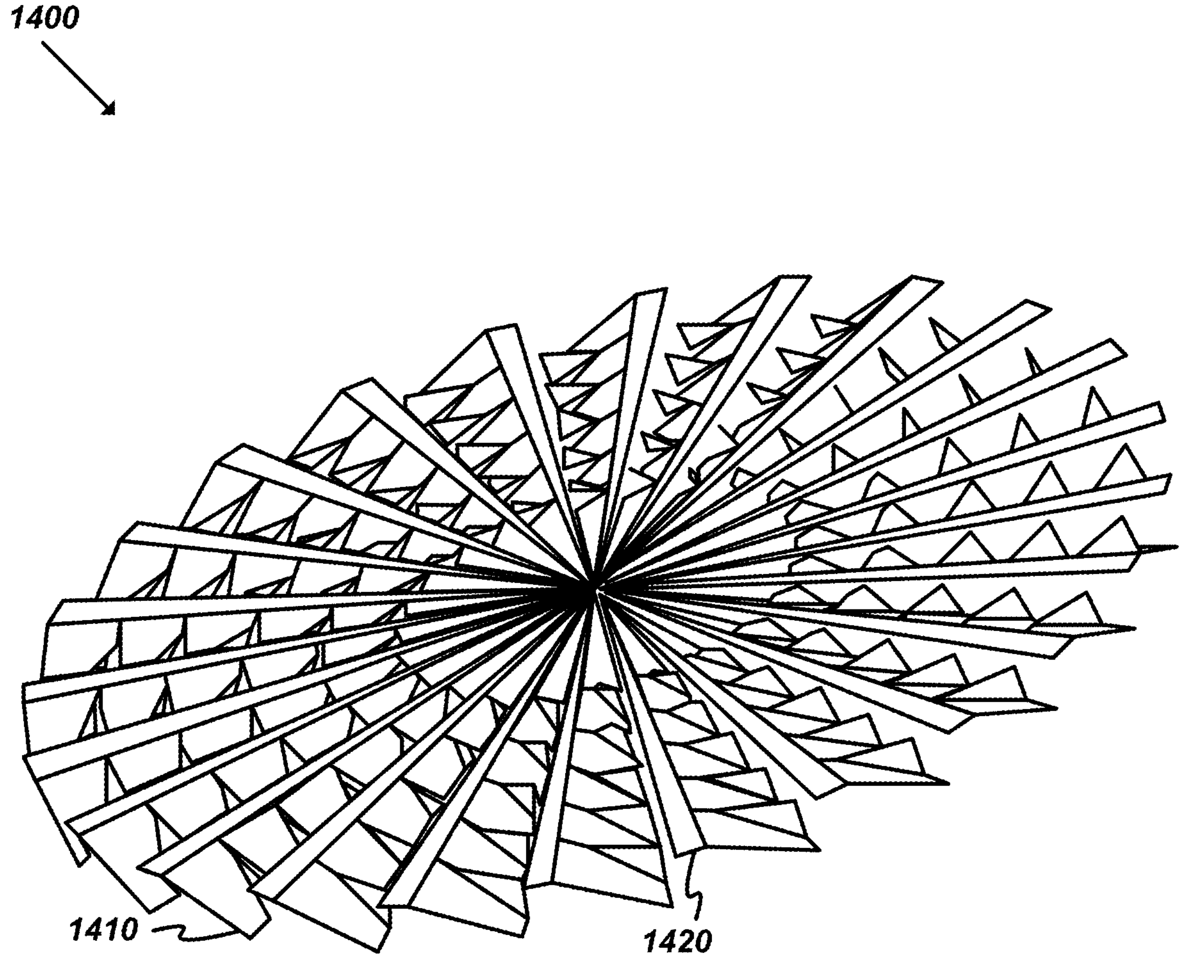
FIG. 14 illustrates a front, top, right side perspective view of a circulator of one or more embodiments described herein including an array of baffled directional flow guides.

FIG. 14 illustrates a front, top, right side perspective view of a circulator 1400 of one or more embodiments described herein including an array of baffled directional flow guides 1410 arranged along a set of rotary spokes 1420. Circulator 1400 may be manufactured using, for example, sheet metal cutting, stamping, and/or bending to make multiple baffles and deflectors to induce circulation.

Circulator 1400 may be formed using a single disk of any material that may be strategically cut and bent. Depending on the material, different processes may be used to ensure permanent shape retention.

Figure 15:
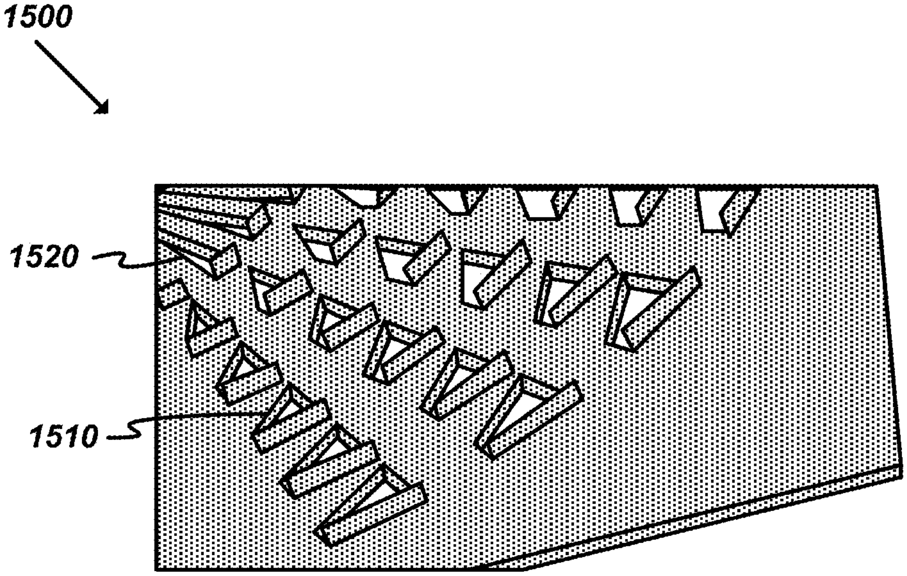
FIG. 15 illustrates a front, bottom, right side perspective view of a baffled inlet plate with varying size and shaped ports of one or more embodiments described herein.

FIG. 15 illustrates a front, bottom, right side perspective view of a baffled inlet 1500 with varying size and shaped inlet ports 1510 of one or more embodiments described herein. As shown, each inlet port 1510 may include, or be associated with, perpendicular wall deflectors to force pressures along bent-tab fins 1520 for circulation. Baffled inlet 1500 may be used with circulator 1400 in some embodiments to generate preferential internal channels when aligned and combined.

Figure 16:
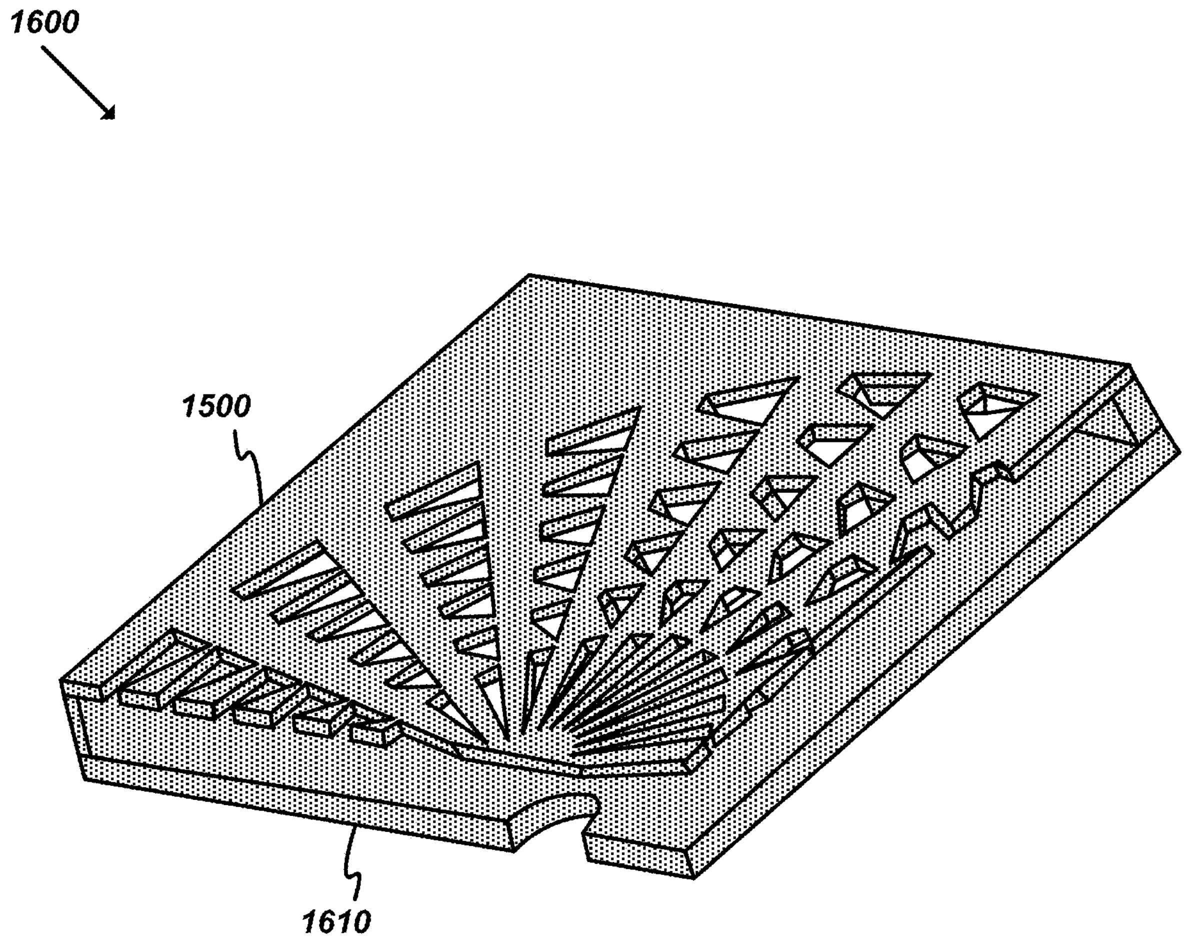
FIG. 16 illustrates a front, top, right side perspective view of an acoustic barrier with varying size baffles and internal deflectors of one or more embodiments described herein.

FIG. 16 illustrates a front, top, right side perspective view of an acoustic barrier 1600 with varying size baffles and internal deflectors of one or more embodiments described herein. Acoustic barrier 1600 is, in this example, a three-laminate sheet metal stamped and bent to form vorticity-inducing deflectors.

Baffled inlet 1500, circulator 1400, and a flat plate-type outlet 1610 may form a three-laminate structure that has bent flanges that direct the sounds tangentially around multiple, nested annular paths of various diameters. The outlet 1610 shows a vent in the center, but could have more than one vent located strategically throughout, or no vents at all. The bent tabs force a redirection of the percussive sound to travel in a vortex path, and hysteresis is generated when the rarified sound pressure is pulled omnidirectionally from areas around each bent tab without any circulation.

Figure 17:
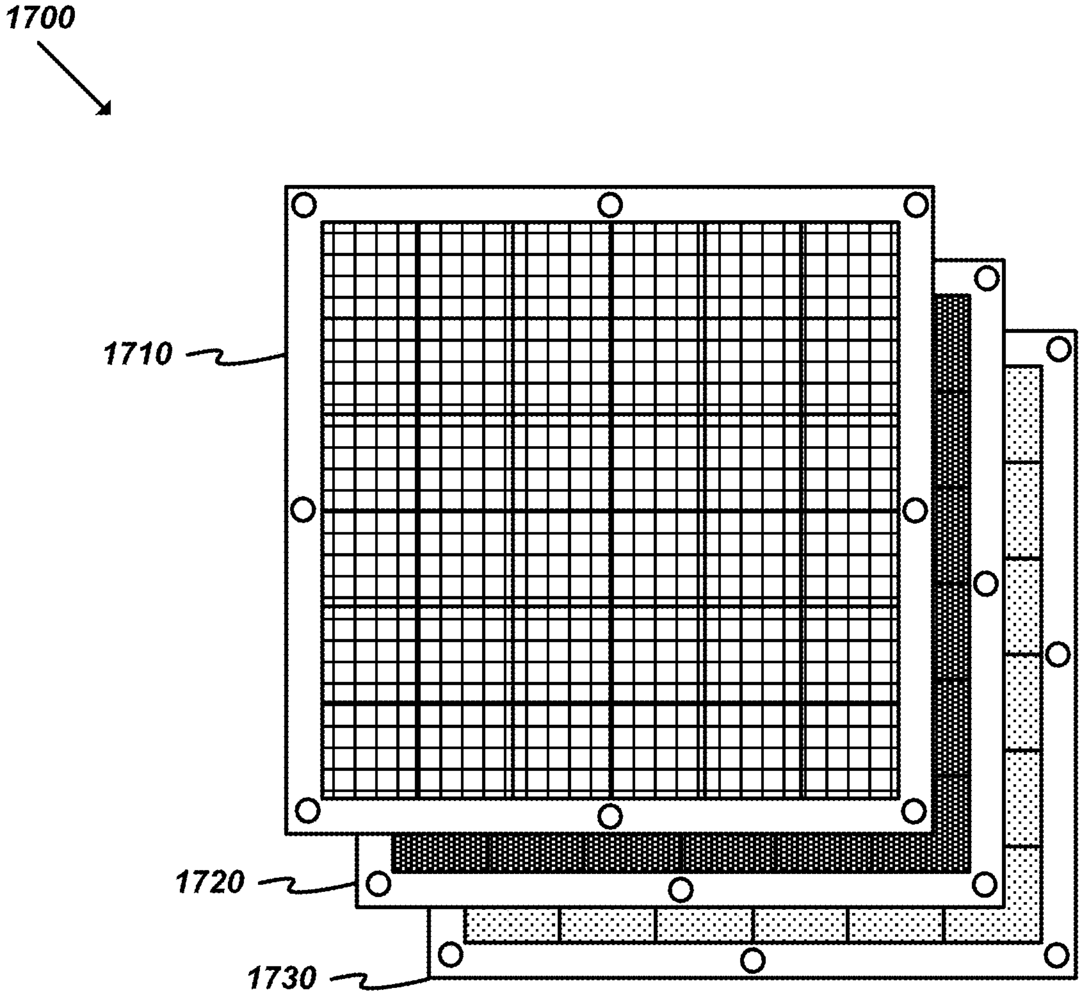
FIG. 17 illustrates a top plan view of a metamaterial of one or more embodiments described herein.

FIG. 17 illustrates a top plan view of a metamaterial 1700 of one or more embodiments described herein. The metamaterial 1700 may include an inlet sheet 1710, circulator sheet 1720, and outlet sheet 1730. Each sheet 1710-1730 may include arrayed elements properly aligned for one preferential movement direction.

Large arrays of elements may be aligned to have a preferential flow direction because of the orientation of the vortex diode (e.g., wind or exhaust flows). Alternating the arrays of vortex diodes in a large sheet may provide spatial averaging of the flow transmission and directional effects of the particular stacked transmission or impedance.

Figure 18:
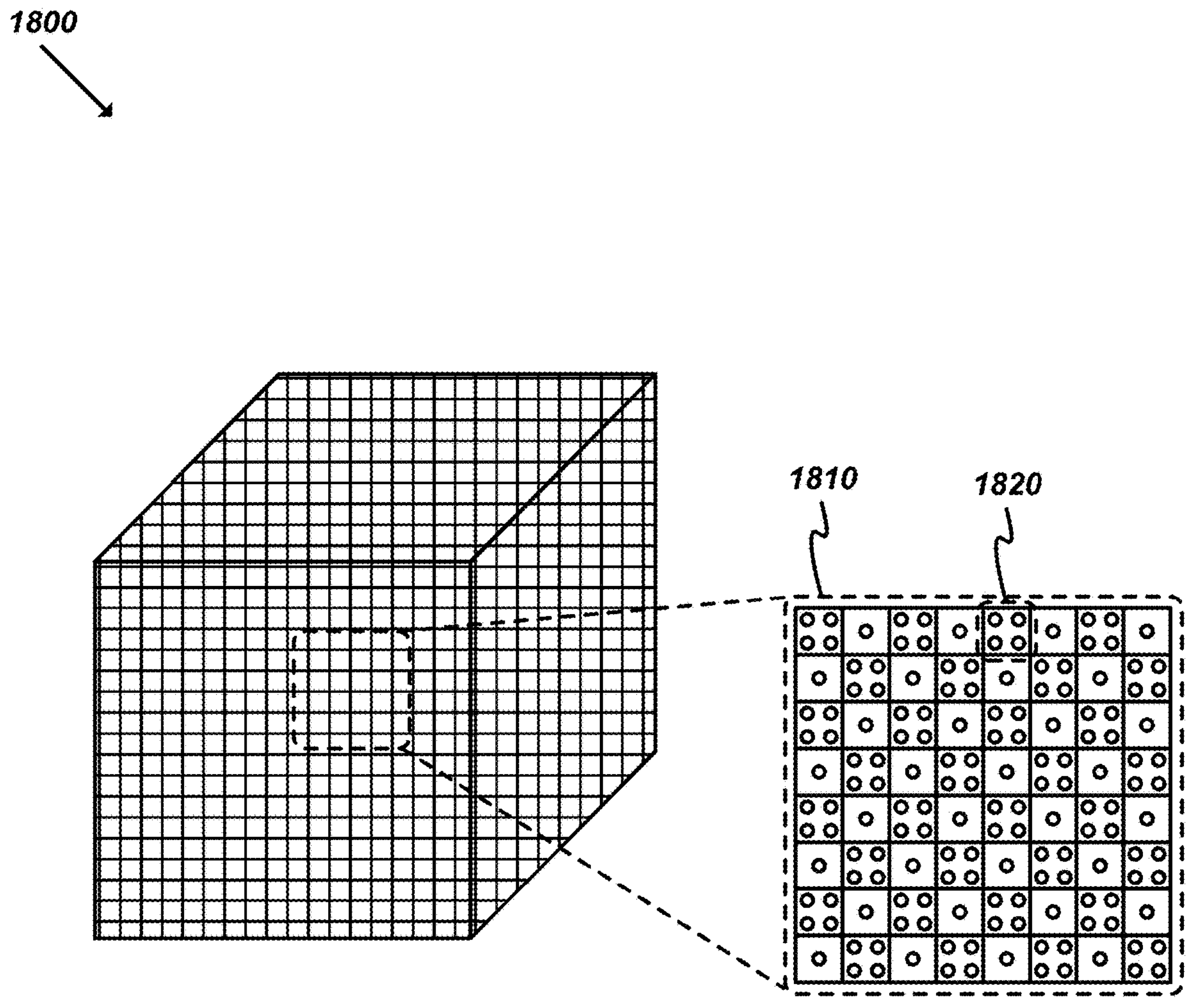
FIG. 18 illustrates a front, top, right side perspective view of a cubic enclosure of one or more embodiments described herein.

FIG. 18 illustrates a front, top, right side perspective view of a cubic enclosure 1800 of one or more embodiments described herein. The cubic enclosure 1800 may include metamaterial sheets. As shown, metamaterial sheet section 1810 may include an array of vortex diodes 1820. The vortex diodes 1820 in this example may be similar to vortex diode 300 described above. In this example, the vortex diodes 1820 are shown in an alternating array that may provide bidirectional attenuation. Some embodiments may include unidirectional arrays, and/or different ratios of elements aligned in each direction (e.g., other than a fifty percent split as shown). Metamaterial sheet sections 1810 may include randomized port locations, sizes, and/or preferential directions in some embodiments.

Such metamaterial sheet sections 1810 may be flexible such that the sheets may be arranged in different configurations (e.g., bent to form a cylindrical tube). Such sheets may be associated with various structural supports, frames, etc. Further, such metamaterials may be formed in any desired shape, with an associated array of vortex diodes or similar features.

Cubic enclosure 1800 may be used, for example, to prevent noise generated by an internal device from escaping. Cubic enclosure 1800 may prevent external noises effecting some instrumentation inside the cubic enclosure 1800. Cubic enclosure 1800 may represent a relatively large room such as a conference room or industrial plant that has one or more barriers to acoustically isolate one area from another. Large, flat, or conformal sheets of metamaterials described herein may reduce transmission and reverberation in factories, entertainment venues, offices, residences and within vehicles, for example.

Figure 19:
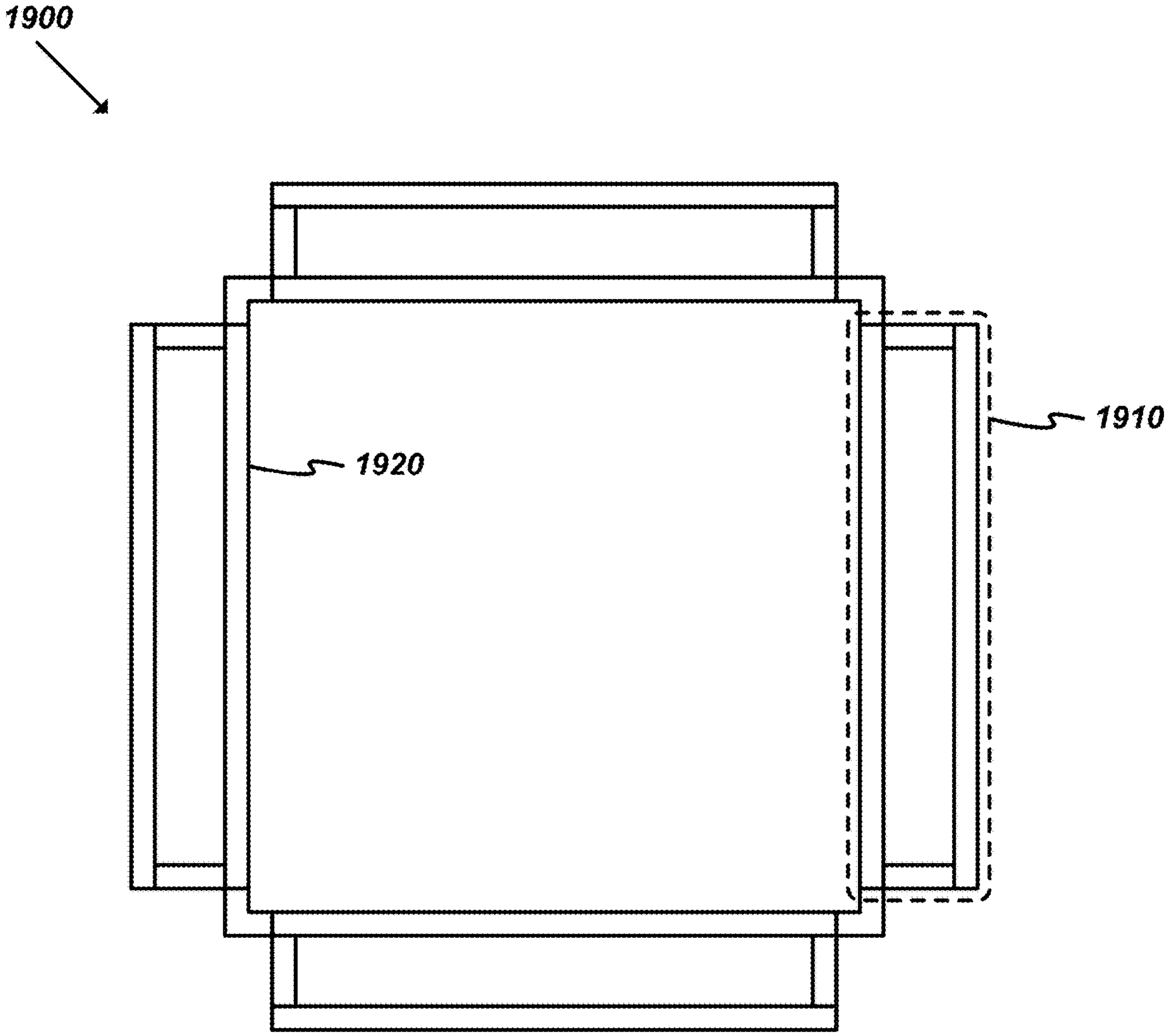
FIG. 19 illustrates a front elevation view of a square channel with parasitic outer volumes of one or more embodiments described herein.

FIG. 19 illustrates a front elevation view of a square channel 1900 with outer parasitic volumes 1910 of one or more embodiments described herein. A multi-laminate chamber passageway or "duct" for heating, ventilation, and air conditions (HVAC) may include vorticity sheets, and/or other metamaterials, that are able to line a duct or enclosure and be coupled directly to the ambient environment on the outside or could feed additional layers of sheets or one or more sealed cavities for parasitic capacitance. A square interior channel may include, for example, four composite sheets 1920 and sealed outer parasitic volumes 1910 attached to each sheet.

Sound transmission through ducts, halls or conduits may be reduced using such elements to help isolate and attenuate sounds as the sounds travel along a pathway. In this example, a four-panel duct attenuator may preferentially allow the high-pressure acoustic pulses to enter the four outer parasitic volumes 1910 for attenuation, but enable HVAC fluid flows to pass through the innermost square channel. These attenuation regions of outer parasitic volumes 1910 may be placed at discrete locations along the path, or longer continuous sections, depending on the application.

Figure 20:
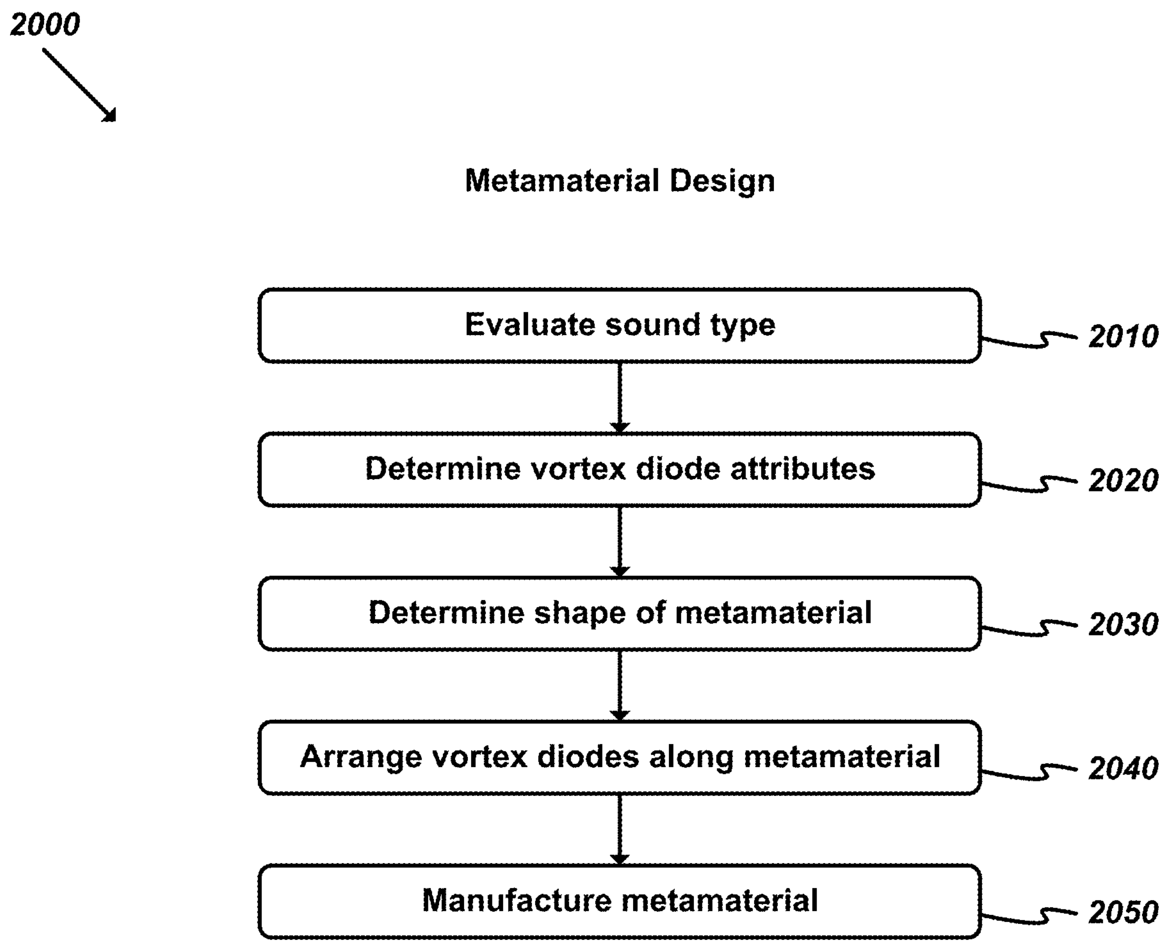
FIG. 20 illustrates a flow chart of an exemplary process that generates a metamaterial design.

FIG. 20 illustrates an example process 2000 for generating a metamaterial design. The process 2000 may be used to generate an arrangement of vortex diodes or similar components to attenuate sound or fluid movement. The process 2000 may be performed whenever a metamaterial is created. In some embodiments, process 2000 may be performed by a computing device.

As shown, process 2000 may include evaluating (at 2010) a sound type associated with the metamaterial. Such evaluation may include evaluation of a sound source to be attenuated (e.g., an engine or other known acoustic source). As another example, such evaluation may include evaluation of environmental sounds to which some equipment may be exposed. Evaluation may include, for instance, determining or modeling a frequency range, audio power, and/or other relevant sonic attributes.

Process 2000 may include determining (at 2020) vortex diode attributes. Such attributes may include, for instance, number, size, and arrangement of features such as inlet ports, outlet ports, and vortex chambers. The components of the vortex diodes may be sized and shaped as appropriate for the expected audio power and frequencies the metamaterial will encounter.

The process may include determining (at 2030) a shape of the metamaterial. The shape of the metamaterial may be determined in various appropriate ways, depending on various relevant factors. For instance, the metamaterial may be shaped to enclose a particular component, device, or system. As another example, the metamaterial (or elements thereof) may be shaped and/or sized to interface to a particular source (e.g., an automobile exhaust pipe). In addition to determining a shape of the metamaterial, in some embodiments, process 2000 determine a set of materials to include in the metamaterial (e.g., metals, plastics, etc.), depending on attributes of the operating environment (e.g., ambient temperature, external stresses, etc.).

As shown, process 2000 may include arranging (at 2040) the vortex diodes along the metamaterial. Based on the size and shape of the vortex diodes, and/or the shape or other attributes of the metamaterial, an arrangement of vortex diodes may be generated. Such an arrangement may include 3D arrays of diodes as described herein.

Process 2000 may include manufacturing (at 2050) the metamaterial. The arrangement of vortex diodes along the metamaterial may be implemented using various appropriate processes, such as injection molding, 3D printing, stamping, machining, etc. Manufacturing may include coupling various elements together (e.g., the plates or layered components described above may be coupled together in an appropriate alignment using adhesives).

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

I claim:

1. A sound modifying metamaterial, comprising:

acoustically coupled circulation elements, each circulation element comprising:

helical circulation volume extending between the inlet and the outlet, the helical circulation volume being configured to define a continuous sound propagation path.

2. The sound modifying metamaterial of claim 1, wherein the array comprises a periodic arrangement of the circulation elements.

3. The sound modifying metamaterial of claim 1, wherein the array of circulation elements comprises a plurality of circulation elements arranged in parallel.

4. The sound modifying metamaterial of claim 1, wherein the array of circulation elements comprises a plurality of circulation elements arranged in series.

5. The sound modifying metamaterial of claim 1, wherein:
- the inlet is a plate inlet comprising a set of inlet ports;
- the outlet is a plate outlet comprising a set of outlet ports; and
- the circulation volume is a plate element comprising a set of tangential jets, wherein each tangential jet is associated with an inlet port from the set of inlet ports, and each tangential jet is fluidically coupled to a round circulation chamber.

6. The sound modifying metamaterial of claim 5, wherein the set of inlet ports comprises four cylindrical inlet ports distributed about the plate inlet.

7. The sound modifying metamaterial of claim 6, wherein the set of outlet ports comprises a cylindrical outlet port centered in the outlet.

8. A bi-directional sound modifying metamaterial comprising:
- an array of circulation elements, each circulation element comprising:
- a first inlet plate comprising a first set of inlets;
- a first circulator plate coupled to the first inlet plate;
- an outlet plate comprising a set of outlets, wherein the outlet plate is coupled to the first circulator plate;
- a second circulator plate coupled to the output plate;
- a second inlet plate comprising a second set of inlets coupled to the second circulator plate.

9. The bi-directional sound modifying metamaterial of claim 8, wherein the array of circulation elements comprises a plurality of circulation elements arranged in parallel.

10. The bi-directional sound modifying metamaterial of claim 8, wherein the array of circulation elements comprises a plurality of circulation elements arranged along a three-dimensional sheet having a set of rows and columns.

11. The bi-directional sound modifying metamaterial of claim 8, wherein the first set of inlets comprises a set of cylindrical cavities.

12. The bi-directional sound attenuating metamaterial of claim 8, wherein the set of outlets comprises at least one cylindrical cavity.

13. The bi-directional sound modifying metamaterial of claim 8, wherein the first circulator plate comprises a circulation volume having a first set of tangential jets, wherein each tangential jet from the first set of tangential jets is associated with an inlet from the first set of inlets.

14. The bi-directional sound modifying metamaterial of claim 13, wherein the second circulator plate comprises a circulation volume having a second set of tangential jets, wherein each tangential jet from the second set of tangential jets is associated with an inlet from the second set of inlets.

15. A method comprising:
- evaluating a sound type;
- determining a set of vortex diode attributes;
- determining a shape of a metamaterial; and
- arranging a plurality of vortex diodes in an array along the metamaterial.

16. The method of claim 15, wherein determining the set of vortex diode attributes comprises:
- determining a set of inlet attributes;
- determining a set of outlet attributes; and
- determining a set of circulation volume attributes.

17. The method of claim 15, wherein each vortex diode from the plurality of vortex diodes is a stacked plate vortex diode having a cuboid shape.

18. The method of claim 17, wherein the array comprises a set of rows and a set of columns.

19. The method of claim 15, wherein the plurality of vortex diodes comprises at least a first set of vortex diodes having a first set of dimensions and a second set of vortex diodes having a second set of dimensions.

20. The method of claim 15 further comprising determining a set of materials to include in the metamaterial.

* * * * *